Feb. 26, 1963  C. W. SEHY  3,079,559
AUTOMATIC AUTOMOBILE RADIO VOLUME ADJUSTER
Filed Nov. 7, 1960
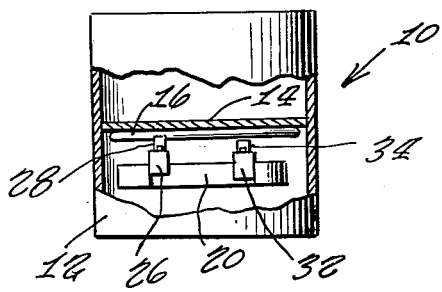
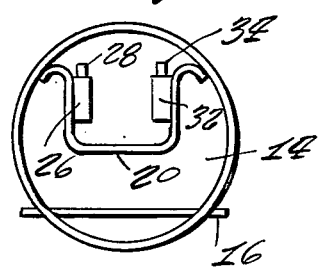
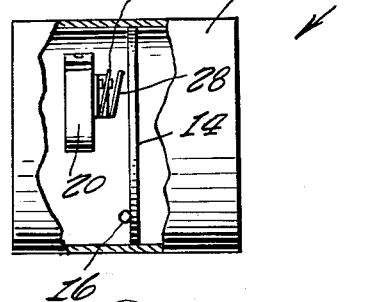
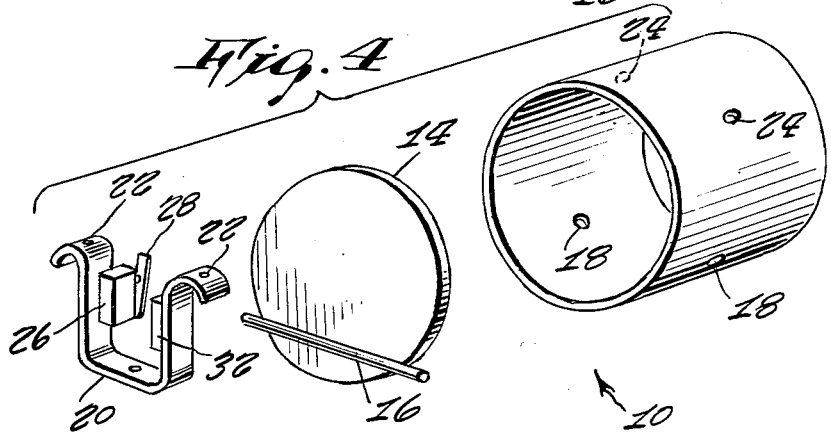
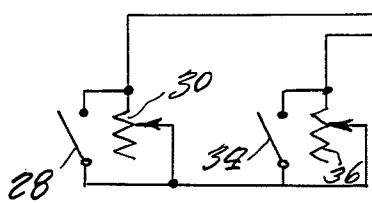
INVENTOR.
CHARLES W. SEHY
BY
Carl Miller
ATTORNEY

United States Patent Office 3,079,559
Patented Feb. 26, 1963

3,079,559
AUTOMATIC AUTOMOBILE RADIO
VOLUME ADJUSTER
Charles W. Sehy, 93—06 Vanderveer St.,
Queens Village, N.Y.
Filed Nov. 7, 1960, Ser. No. 67,845
2 Claims. (Cl. 325—406)

This invention relates to automotive vehicles and more particularly to an accessory therefor.

It is an object of the present invention to provide a speed responsive device for attachment to a vehicle which will automatically control the volume of the radio to provide for audible reception at all times.

Another object of the present invention is to provide an automatic radio volume control having built in resistors which are normally in series circuit with the speaker of the radio, and which resistors are shunted out sequentially as the speed of the vehicle increases, to thus increase the volume of the speaker to accommodate for road noises while traveling at such higher speeds.

All of the foregoing and still further objects and advantages of this invention will become apparent from a study of the following specification, taken in connection with the accompanying drawing, wherein:

FIGURE 1 is a top plan view, with parts broken away, of a speed responsive device forming a part of the present invention;

FIGURE 2 is a rear elevational view of the device shown in FIGURE 1;

FIGURE 3 is a side elevational view of the assembly shown in FIGURE 1, with parts broken away;

FIGURE 4 is an exploded perspective view of the apparatus shown in FIGURES 1 to 3; and FIGURE 5 is a schematic wiring diagram of the present invention.

Referring now to the drawing, an automatic automobile radio volume control assembly 10 made in accordance with the present invention is shown to include substantially cylindrical housing 12 for mounting upon the vehicle substantially coaxially with the direction of movement thereof. An air pressure responsive plate 14 having a pivot shaft 16 rotatably received within bearing openings 18 at spaced apart openings of the housing 12, will move rearwardly under the pressure of the wind encountered by the vehicle when traveling along a road.

Mounted directly berind the air pressure responsive plate 14, is a U-shaped bracket 20 having mounting openings 22 for receiving screws through openings 24 in the housing 12 to mount the bracket rigidly behind the plate 14. A pair of switches 26, 32 are mounted upon the bracket 20 in staggered relationship, one such switch 26 being spaced closer to the plate 14 than the other such switch 32. The one switch 26 includes a lever 28 which may be closed by rearward movement of the air responsive plate 14 to provide a shunt across a resistor 30 in series circuit with the radio speaker 38. The other switch 32 also includes a lever 34 that is spaced slightly to the rear of the lever 28 of the first switch 26, to short out another resistor 36 in series circuit with the speaker 38.

It will thus be recognized that with the plate 14 in a normally vertical position, forward movement of the vehicle will produce an air pressure upon such plate 14 tending to move it rearwardly into contact with the levers 28, 34. As the speed of the vehicle increases, the plate 14 will be moved rearwardly sufficiently to at first close the first lever 28 through the switch 26, to cut out the first resistor 30, thus automatically increasing the volume of the speaker 38 because of the reduced circuit resistance. Upon attaining still a higher speed, the plate 14 will then also close the second lever 34, shunting out the second resistor 36, and thus appreciably increasing the volume of the speaker 38. It will thus be recognized that the system can be adjusted so that three or more stages of volume may be provided; namely, at standstill, at approximately twenty-five to thirty miles an hour, and at approximately fifty to sixty miles an hour and above, whereby the increased road noise and air noise found during traveling at higher speeds are compensated for by an increase in volume of the speaker 38 resulting from the shunting out of the resistance elements.

The initial adjustment of the system is accomplished in the following manner: With the car traveling at the higher speeds (50 to 60 m.p.h.) and resistors 30, 36 at minimum resistance, set automobile radio volume control to desired volume. Slow car to medium speeds (25 to 30 m.p.h.), adjust resistor 36, to lower volume, to desired level. Slow car to standstill and adjust resistor 30, to lower volume, to a still lower desired level.

This device can be conveniently mounted in any desired area on the automotive vehicle, so as not to detract from the appearance of the vehicle or to interfere with any of the other operating parts.

While this invention has been described with particular reference to the construction shown in the drawing, it is to be understood that such is not to be construed as imparting limitations upon the invention, which is best defined by the claims appended hereto.

Having thus described my invention, I claim as new and desire to secure by Letters Patent:

1. An automatic vehicle radio volume step control comprising a plurality of variable resistances connected in series with the radio speaker, normally open shunt switches each connected in parallel with one of the resistances and short circuiting such resistance when closed, and an actuating device responsive to air pressure in accordance with vehicle movement to sequentially close the switches with progressive step increases in pressure to increase the radio volume in steps as each resistance is short circuited.

2. The control according to claim 1 in which the actuating device comprises a tube enclosing and supporting the switches, and a pressure plate movably mounted in the tube adjacent the front of the switches to be moved into operating engagement sequentially with the switches by increasing air pressure in the tube.

References Cited in the file of this patent

UNITED STATES PATENTS

| | | |
|---|---|---|
| 2,080,554 | Wolff | May 18, 1937 |
| 2,127,823 | Leifheit | Aug. 23, 1938 |
| 2,135,738 | Todd | Nov. 8, 1938 |
| 2,168,045 | Pack | Aug. 1, 1939 |
| 2,216,520 | Reinartz | Oct. 1, 1940 |
| 2,226,785 | Soucy | Dec. 31, 1940 |